United States Patent [19]

Briedis

[11] 4,223,855
[45] Sep. 23, 1980

[54] BRAKING SYSTEM FOR REEL-TO-REEL TAPE TRANSPORT

[75] Inventor: Juozas Briedis, Chicago

[73] Assignee: Pentagon Industries, Inc., Chicago, Ill.

[21] Appl. No.: 948,249

[22] Filed: Oct. 3, 1978

Related U.S. Application Data

[63] Continuation-in-part of Ser. No. 865,562, Dec. 29, 1977, abandoned.

[51] Int. Cl.$^3$ .................... B11B 15/32; G03B 1/04
[52] U.S. Cl. .................................... 242/204; 242/75.5
[58] Field of Search ............. 242/204, 203, 210, 75.51

[56] References Cited

U.S. PATENT DOCUMENTS

| | | | |
|---|---|---|---|
| 2,868,470 | 1/1959 | Selsted | 242/204 |
| 2,974,891 | 3/1961 | Waldhauer | 242/203 |
| 3,141,625 | 7/1964 | Namenyi-Katz | 242/204 |
| 3,141,626 | 7/1964 | Hoskin | 242/203 |
| 3,608,847 | 9/1971 | Hufford | 242/204 |
| 3,664,609 | 5/1972 | McMillin, Jr. | 242/204 |
| 3,937,422 | 2/1976 | Kato | 242/204 |

*Primary Examiner*—Harvey C. Hornsby
*Attorney, Agent, or Firm*—Dann, Dorfman, Herrell and Skillman

[57] ABSTRACT

In order to obtain smooth and positive braking, particularly with very thin magnetic tapes, a tape transport is provided which combines dynamic braking with specially configured mechanical braking means. During normal operation, dynamic braking is employed to bring the supply and take-up reel motors to a stop. A motion sensor detects the instant the reels stop and deenergizes a solenoid which holds the mechanical braking sub-system out of action during play and reeling operations. When the solenoid is deenergized, a pair of linked-together pivot arms are pulled into engagement with the reel drums by springs to obtain holding torque when the reels are at rest. The reel-engaging ends of the pivot arms are fitted with brake pads arranged to obtain differential braking torque between the supply and take-up reels according to the tape directions, a feature which is particularly useful when power failure occurs during tape handling operations. Loss of power automatically releases the solenoid permitting the mechanical system to brake the reels to a stop without tape spillage. A varient configuration employs individual solenoids to actuate similar mechanical braking means fitted to the lower ends of the supply and take-up reel motors.

13 Claims, 12 Drawing Figures

BRAKING SYSTEM FOR REEL-TO-REEL TAPE TRANSPORT

RELATED APPLICATIONS

This application is a continuation-in-part of co-pending U.S. application Ser. No. 865,562; filed Dec. 29, 1977 now abandoned; by Juozas Briedis; assigned to the same assignee herewith; and entitled "Braking System for Reel-to-Reel Tape Transport."

BACKGROUND OF THE INVENTION

This invention relates to the tape recording parts, and, more particularly, to an improved braking system for a reel-to-reel tape transport.

Braking systems for reel-to-reel magnetic tape transports may be generally categorized as either dynamic or mechanical.

Dynamic (or electrical) braking systems employ a braking current passed through the motor windings to provide braking action. This braking current is usually d-c although some systems employ "reverse-torque" a-c braking current. The braking action must be differential with the greater drag imposed on the payout reel to avoid tape spillage. Once the proper currents have been established for the reel motors for various braking conditions, this form of braking is highly reliable since no friction involving mechanical parts need be considered, the braking action being obtained from electro-magnetic fields. There are, however, two inherent problems associated with the use of dynamic braking when conventional a-c reel drive motors are employed. First, braking action is proportional to the angular speed of the motor and is therefore high when the motor is rotating at a high speed and drops to a very low value when the motor is stopped, thus, giving very poor holding action. Second, the amount of braking current required for smooth and rapid braking action frequently causes overheating of the motor if left on for extended periods to obtain holding action while the reels are stopped.

Mechanical braking systems are commonly used in reel-to-reel recording equipment and normally consist of a brake drum or hub attached to each reel drive shaft, together with a brake band or pad which can be brought to bear against the drum surface to provide stopping action due to friction. To avoid spilling or breaking the tape, the decelerating action, as with dynamic braking, must be differential; that is, it must provide more braking action on the reel which is paying out tape than on the reel which is taking up. This requirement mandates careful mechanical adjustment to insure proper operation. Practically, however, each time the brakes are applied, there is friction wear between the drum and the brake band or pad surface which results in continuously changing braking characteristics. In addition, the friction characteristics can vary with temperature and humidity, thus giving inconsistent braking action. In practice, mechanical braking systems require periodic adjustment and replacement of friction-worn parts. They do, however, provide good holding action when the reels are not turning.

Those skilled in the art will appreciate that it would be highly desirable to provide a reel-to-reel tape transport having a braking system employing the best characteristics of both dynamic and mechanical braking while avoiding the drawbacks of each, and it is to that end that my invention is directed.

It is therefore a broad object of my invention to provide an improved braking system for a reel-to-reel magnetic tape transport.

It is another object of my invention to provide a braking system for a tape transport which combines the best characteristics of dynamic and mechanical braking.

It is yet another object of my invention to provide unique mechanical braking means for a magnetic tape transport which is employed in conjunction with a dynamic braking system and which takes over the function of the dynamic braking system upon loss of power.

In a more specific aspect, it is an object of my invention to provide a combination dynamic and mechanical braking system for a magnetic tape transport wherein the mechanical braking sub-system, by virtue of its shape and disposition of brake pads carried by pivoted arms disposed proximate payoff and take-up reels, obtains differential braking according to the tape direction.

SUMMARY OF THE INVENTION

Briefly, these and other objects of the invention are achieved, in a first embodiment, by providing a motion sensor to determine the instant at which a dynamic braking system has brought the reel motors of a tape transport to a halt. As soon as the stop has occurred, as detected by the motion sensor, a mechanical braking system is applied to provide holding torque. The mechanical braking is effected by the action of a pair of brake pads mounted for engagement with drums fixed on supply and take-up reel motor shafts. The brake pads are mounted on pivot arms at such an angle to the drums as to provide a self energizing wedge action which also achieves differential braking according to the tape direction if the mechanical braking sub-system is activated, under emergency conditions, when the tape is in motion. In order to avoid the requirement for critical adjustment of the mechanical brake systems, each brake is bonded to a leaf spring at the outer end of its pivot arm. The two pivot arms are constrained to move in unison by linkage; and, normally, when the tape is moving, a solenoid is actuated (against the pull of a pair of tension springs) to hold the mechanical braking system out of engagement with drums, thereby affording, due to the automatic braking differential, an emergency stop without tape spillage, regardless of the tape movement direction.

In a second, and presently preferred embodiment of the invention, accessibility to the electromechanical elements of the braking system is improved by mounting the pivot arms (suitably modified), the brake drums, and the motion and direction sensing apparatus on the lower ends of the supply and takeup reel motors. In this variant configuration, individual solenoids are employed to obviate the need for connecting linkage.

DESCRIPTION OF THE DRAWINGS

The subject matter of the invention is particularly pointed out and distinctly claimed in the concluding portion of the specification. The invention, however, both as to organization and method of operation may best be understood by reference to the following description taken in connection with the accompanying drawing of which:

DETAILED DESCRIPTION OF THE INVENTION

Figure 1:
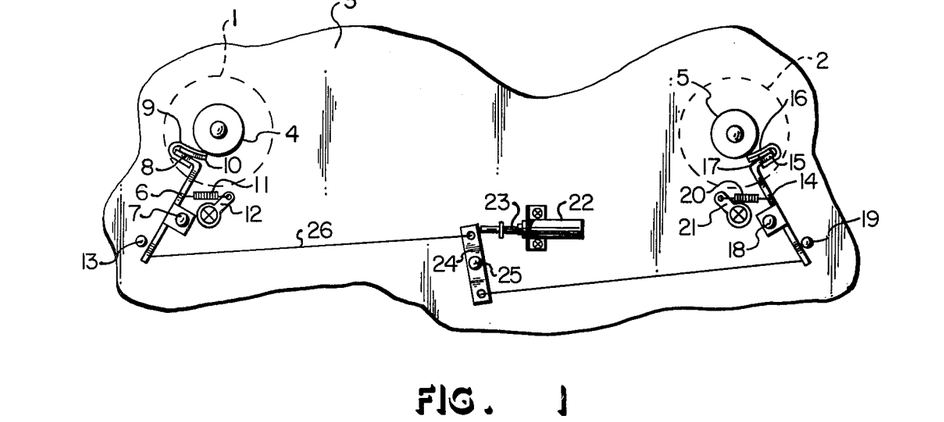
FIG. 1 is a partial view of a tape transport illustrating the principal elements of the mechanical brake assembly in a holding position.

Referring now to FIG. 1, it will be observed that supply and take-up reel motors, 1 and 2 are vertically disposed beneath a support plate 3 and are directly connected, respectively, to drums 4 and 5. Thus, it will be understood that reel support means, not shown, may overlay the drums 4 and 5 such that reels of magnetic tape may be controllably passed by tape heads, not shown, in the usual fashion well-known in the art. In order to more clearly set forth the invention, these elements, which are common to all reel-to-reel tape transports, are not shown in the drawing.

A first pivot arm 6 is pivotally fixed to the cover plate 3 at a pivot point 7 and is provided, at one end, with a right angle portion 8 carrying a brake pad 9 which is urged generally outwardly by a leaf spring 10. A tension spring 11 has one end fixed to the pivot arm 6 intermediate the pivot point 7 and the right angle portion 8. The other end of the tension spring 11 is fixed with respect to the cover plate 3 by any convenient means such as the bracket 12. The straight end of the pivot arm 6 extends to intercept a banking pin 13 should it pivot sufficiently in a clockwise direction.

A second pivot arm 14, essentially a mirror image of the pivot arm 6, is also provided with a right angle portion 15 which carries a brake pad 16 urged generally outwardly by a leaf spring 17. The pivot arm 14 may rotate about a pivot point 18 in a counter-clockwise direction until arrested by a banking pin 19. A tension spring 20, fixed to one end to the cover plate 3 by a bracket 21, has its other end connected to the pivot arm 14 intermediate the right angle portion 15 and the pivot point 18 to thereby urge the pivot arm 14 to rotate in a counter-clockwise direction.

A pull solenoid 22, which is fixed to the cover plate 3, has the outer end of its plunger 23 coupled to pull a pivot member 24 in a clockwise direction upon energization of the coil of the solenoid 22. The pivot member 24 is pivotally fixed to the cover plate 3 at a pivot point 25. A first link element 26 extends from the straight end of the pivot arm 6 to the end of the pivot member 24 to which the plunger 23 of the solenoid 22 is coupled. Similarly, a second link element extends from the other end of the pivot member 24 to the end of the pivot arm 14.

Since the pivot points 7 and 18 of the pivot arms 6 and 14, respectively, are positioned on the pivot arm side facing the pivot member 24, it will be apparent that energization of the solenoid 22, and consequent retraction of the plunger 23, will result in a clockwise translation of the pivot member 24 which pulls the straight ends of the pivot arms 6 and 14 toward one another. Under these conditions, depicted in FIG. 2, it will be seen that the brake pads 9 and 16 have been pulled away from engagement with the drums 4 and 5, respectively. Thus, when the solenoid 22 is actuated, rotation of the drums 4 and 5 is under the control of reel motors 1 and 2 and, of course, the inertia and linking effects of tape reels and tape, not shown, which would be carried by the drums during tape handling operations.

Figure 2:
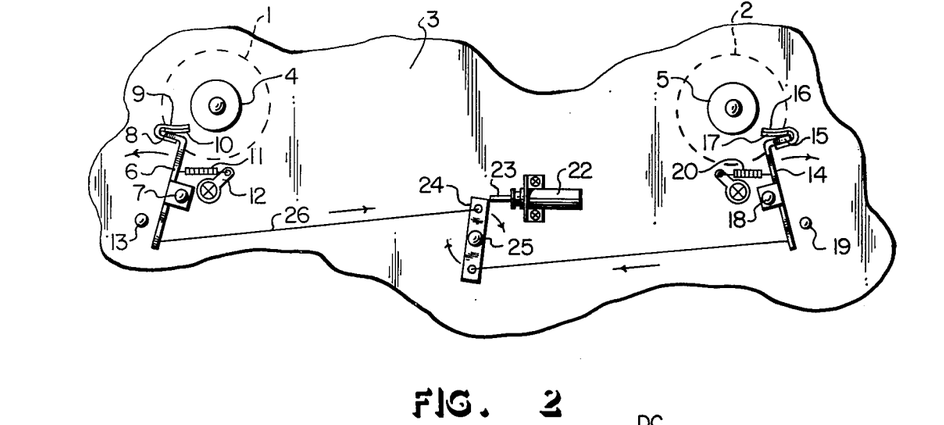
FIG. 2 is a view similar to FIG. 1, but showing the mechanical brake assembly in a run position.
Figure 3:
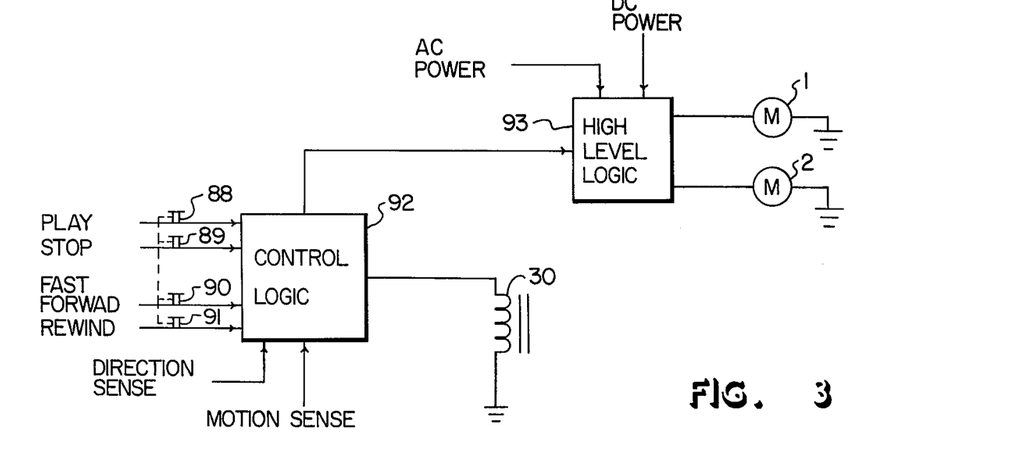
FIG. 3 is a major logic block diagram of the electronic and electrical power sections of the transport braking and reeling systems.

A basic understanding of the cooperative functional relationship between the dynamic braking sub-system and the mechanical braking sub-system may be obtained from a study of FIG. 3 in conjunction with FIGS. 1 and 2. As shown in FIG. 3, play, fast forward, rewind, and stop information may be applied to control logic block 92 along with direction sense and motion sense information obtained from instantaneous operating conditions. When the transport is in the play, fast forward, or rewind mode of operation, the solenoid coil 30 of the solenoid 22 (FIGS. 1 and 2) is energized such that the mechanical braking system assumes the position shown in FIG. 2; i.e., decoupled from the reels. Additionally, the control logic 92 interprets the present mode of operation and the present direction in which the tape is passing to set up conditions within the high level logic 93 by which appropriate energization of the supply reel motor 1 and take-up reel motor 2 are motivated. In the play mode, both motors receive the same diminished, a-c energization and consequently exhibit equal, but oppositely directed, torque. The tape direction in the play mode is, of course, controlled by the capstan and pinch roller, not shown. In the fast forward and rewind modes, a higher a-c voltage is applied to the reel receiving the tape than is applied to the reel paying out the tape. In the stop mode from any one of the other modes, dynamic braking d-c is applied to the reel motors with the higher voltage being applied across the motor connected to the payout reel in order to obtain differential braking which avoids tape spillage.

When the motion sensor observes that the tape has been brought to a stop by the dynamic braking system, the control logic 92 deenergizes the solenoid coil 30 to release the solenoid 22 such that the mechanical braking system drops into the position shown in FIG. 1 to obtain static holding operation. Additionally, as will be described more fully below, if power is lost during tape movement, the consequent deenergization of the coil 30 will bring the mechanical braking system into play to provide an emergency halt without tape spillage.

When the motion sensor observes that the tape has been brought to a stop by the dynamic braking system, the control logic 92 deenergizes the solenoid coil 30 to release the solenoid 22 such that the mechanical braking system drops into the position shown in FIG. 1 to obtain static holding operation. Additionally, as will be described more fully below, if power is lost during tape movement, the consequent deenergization of the coil 30 will bring the mechanical braking system into play to provide an emergency halt without tape spillage.

In the presently preferred embodiment, any one of the play, fast forward, or rewind modes may be "on" while the stop mode is characterized by the play, fast forward, and rewind signals all being in the "off" state. These conditions may be set up in any convenient manner. For example, the push button switches 88, 89, 90 and 91 may be mechanically ganged together such that actuation of one switch releases the last previously actuated switch. Alternatively, electronic latching circuits may be employed to achieve the same signal conditions, a technique which is preferable, for example, when operating under remote control, with electronically (rather than mechanically) actuated switches, or with momentary contact switches.

Figure 4:
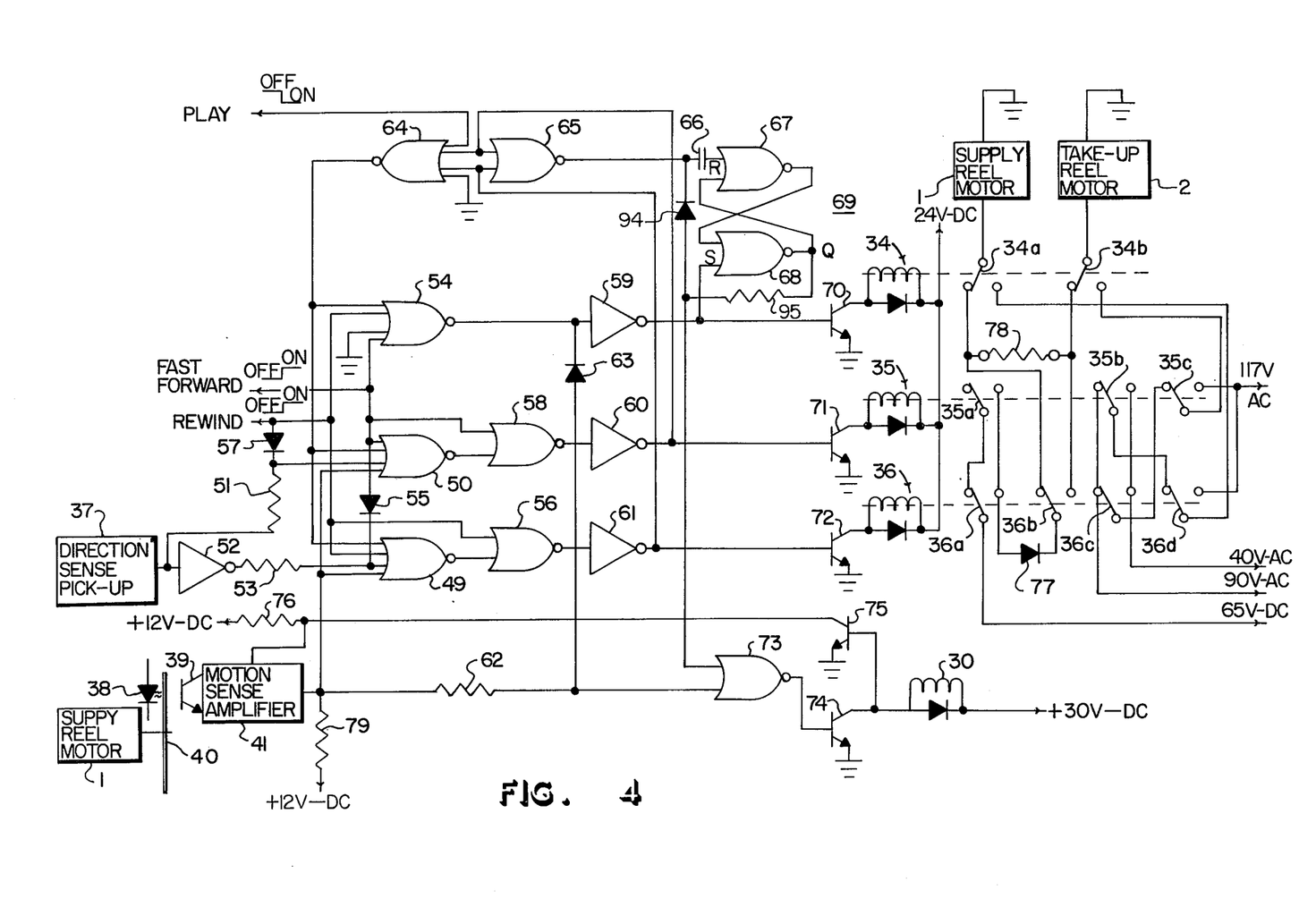
FIG. 4 is a more detailed, partly logical and partly schematic, diagram of the electronic and electrical power sections of the transport braking and reeling system.

The details by which the various modes of steady state and transient operation may be obtained will become apparent from a discussion of FIG. 4 which is a slightly simplified logic and schematic diagram of the invention. The supply 1 and take-up reel motors 2 are variously energized with a-c or d-c according to the respective states of a motion enable relay 34, a fast forward relay 35 and a rewind relay 36. Motion enable relay 34 includes contact sets 34a and 34b. Similarly, fast forward relay 35 includes contact sets 35a, 35b, and 35c; and rewind relay 36 includes contact sets 36a, 36b, 36c, and 36d. As shown in FIG. 4, the relay contact sets are interconnected between the supply 1 and take-up reel motors 2 and various sources of a-c and d-c power. The results obtained from energizing the relays 34, 35 and 36 in several combinations according to the instant operating mode will be discussed below. It may be noted that all the movable contacts of the relay contact sets are depicted in FIG. 4 as if the respective relay coil is deenergized, and it will be understood that energization of a relay coil will cause each of the corresponding contact sets to assume its alternate position.

As previously discussed, play, fast forward, and rewind command signals originate from conventional means, such as pushbutton switches, logic latches, system control logic, or the like. By definition for the logic diagram of FIG. 4, the play input signal is a logic 1 when "off" and a logic 0 when "on", whereas, conversely, the fast forward and rewind signals are logic 0 when "off" and logic 1 when "on". A direction sense pickup 37 issues a logic 0 signal when, as in the play and fast forward modes, the tape is being transferred from the supply reel to take-up reel; conversely, the direction since pickup 37 issues a logic 1 signal when the tape direction is from the take-up reel to the supply reel as in the rewind mode.

Figure 7A:
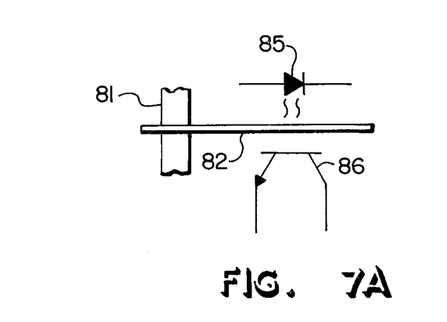
FIGS. 7A and 7B, taken together, illustrate, in additional detail a direction sensor block of the diagram of FIG. 4.
Figure 7B:
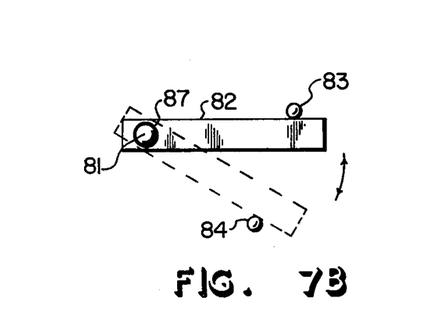

Referring briefly to FIGS. 7A and 7B simultaneously, one specific configuration for the direction sense pickup 37 (FIG. 4) is shown. An elongated tab 82 is provided with an aperture 87 near one of its ends. The shaft 81 of either of the reel motors 1 and 2 extends with slight clearance through the aperture 87. A light emitting diode 85 and a light sensitive transistor 86 are disposed on opposite sides of the tab 82 and in alignment with one another. The tab is free to move about the shaft 81 a few degrees limited by banking pins 83 and 84 as best shown in FIG. 7B. When the tab 82 is banked against pin 83, the light beam between light emitting diode 85 and light sensitive transistor 86 is interrupted thereby providing a first direction indication. When the tab 82 is banked against the pin 84, the light emitting diode 85 and the light sensitive transistor 86 are in light communication thereby providing a second direction indication. In operation, sufficient friction exists between the shaft 81 and the aperture 87 to throw the tab 82 against one or the other of the banking pins 83 and 84 with the shaft thereafter simply turning freely in the aperture.

Motion sensing information is obtained by the interaction between a light emitting diode 38, and a light sensitive transistor 39 which receives light from the LED 38 modulated according to the rate at which a scanning wheel 40 is turning. The scanning wheel 40 is directly driven by the supply reel motor 1, which, for convenience, is shown in two different positions in FIG. 4. In practice, the scanning wheel 40 may comprise alternate sectors of opaque and translucent materials with the LED 38 placed on the opposite side of the scanning wheel 40 from the light sensitive transistor 39. In a well-known variant configuration which is preferably employed in the first embodiment of the invention, the scanning wheel 40 comprises alternate sectors of reflective and non-reflective material with the light emitting diode 38 and the light sensitive transistor 39 being disposed on the same side of the scanning wheel, whereby light from the LED 38 is reflected to the light sensitive transistor 39 when a reflecting sector of the scanning wheel 40 is appropriately positioned. With either arrangement, the light sensitive transistor 39 is periodically rendered conductive so long as the scanning wheel 40 is turning. If, however, no change of state of the light sensitive transistor 39 takes place for a predetermined period of time as sensed by a capacitor charging means within the motion sense amplifier 41, the output from the motion sense amplifier 41 switches from a logic 0 to a logic 1. More particularly, and referring briefly to FIG. 5, each time the light sensitive transistor 39 switches from the conducting to the non-conducting state, a positive pulse is coupled through a coupling capacitor 42 and a diode 43 to charge a storage capacitor 44. When the light sensitive transistor 39 switches from the non-conducting state to the conducting state, a negative pulse is applied to the coupling capacitor 42, but clamp diode 45 prevents the plate of the capacitor 42 to which its cathode is connected from dropping below ground potential. In the meantime, the storage capacitor 44 commences to discharge through resistors 46 and 47. However, as long as motion is sensed such that the capacitor 44 is periodically recharged, the junction between the resistors 46 and 47 remains sufficiently positive to bias a transistor 48 to the conducting state, thereby providing a logic 0 output indicating that the supply reel motor 1 is still in motion. When the supply reel motor 1 comes to a stop such that the light sensitive transistors 39 fails to switch states, no replenishing charge is applied to the storage capacitor 44 which therefore continues to discharge through the resistors 46 and 47 until the transistor 48 is biased off. The collector electrode of the transistor 48 thereupon switches to the logic 1 level indicating that the supply reel has stopped.

Referring again to FIG. 4, the logic output signal from the motion sense amplifier 41 is applied to first inputs of two NOR gates, 49 and 50. The logic output from the direction sense pickup 37 is applied (through an isolation resistor 51) to a second input of the NOR gate 50. Additionally, the dirction sense logic signal is inverted through an inverter 52 which drives, through an isolation resistor 53, a second input to NOR gate 49.

The fast forward signal input is applied to a first input to NOR gate 54, to a fourth input to NOR gate 50, and, through an isolation diode 55, to the second input to NOR gate 49. The second input to NOR gate 54 is clamped to logic 0 potential. The rewind input signal is applied to the third input to NOR gate 54, to the third input of NOR gate 49, to a second input to a NOR gate 56 (which has its first input driven by the output from NOR gate 49), and, through diode 57, to the second input to NOR gate 50. The fast forward input signal is applied to a second input to NOR gate 58 which has its first input driven by the output from NOR gate 50. The output signal from the NOR gate 54 is applied to the input to an inverter 59. Similarly, the output from NOR gate 58 is coupled to the input to an inverter 60, and the output from the NOR gate 56 is coupled to the input of an inverter 61.

Figure 5:
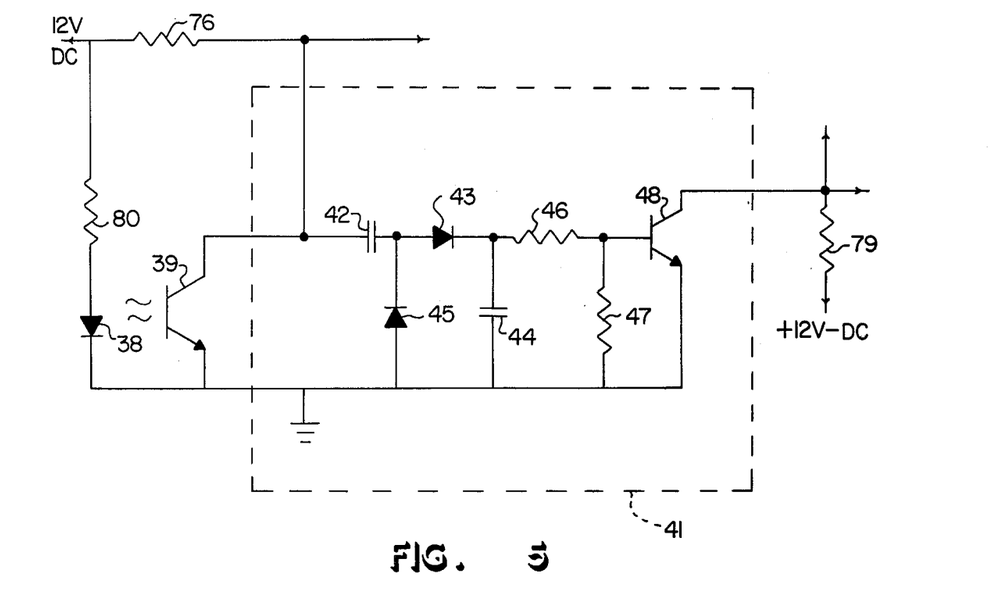
FIG. 5 is a schematic diagram of the motion sensor block of FIG. 4.

The play input signal is applied to a fourth input to a NOR gate 64 which drives fourth inputs to NOR gate 49 and 54 and a third input to NOR gate 50. A first input to NOR gate 64 is clamped to a logic 0 voltage level. The output from inverter 61 is applied to a second input to NOR gate 64 and also to a first input to NOR gate 65. Similarly, the output from inverter 60 is applied to a third input to NOR gate 64 and to a second input to NOR gate 65. The output from the NOR gate 65 is applied, through a coupling capacitor 66, to the reset input of an R-S flip flop 69 comprising cross-coupled NOR gates 67 and 68. The set input to the flip flop 69 is driven by the output from inverter 59 which also is connected to the base electrode of a driver transistor 70 for the motion enable relay 34. Similarly, the output from inverter 60 is connected to the base electrode of a driver transistor 71 for the fast forward relay 35, and the output from the inverter 61 is connected to the base electrode of a driver transistor 72 for the rewind relay 36. The output from the motion sense amplifier 41 also drives, through the isolation resistor 62, a first input to NOR gate 73 which has its second input driven by the Q output from the R-S flip flop 69. The output from NOR gate 73 is applied to the base electrode of a driver transistor 74 for the brake solenoid coil 30. The collector electrode of the driver transistor 74 is also connected to the base electrode of a motion sense inhibit transistor 75. The collector electrode of the transistor 75 is connected through the resistor 76, to a 12-volt d-c power source. The resistor 76 is also shown in FIG. 5.

Consider now the condition and states of the control logic and high level circuitry during various modes of operation.

THE PLAY MODE

During steady state operation in the play mode, the play input signal is "on" and will be at logic 0. The fast forward and rewind input signals are off and thus will also be logic 0. The output from the direction sense pickup 37 will be logic 0, and the output from the motion sense amplifier will be logic 0. The output signals from both the inverters 60 and 61, for reasons which will become apparent below, are also logic 0 such that the NOR gate 64 is fully enabled and therefore issues a logic 1 output which serves to disable NOR gates 49, 50 and 54. Thus, the output signals from the NOR gates 49, 50, and 54 are each logic 0. Since the fast forward signal is also logic 0, the NOR gate 58 is enabled to issue a logic 1 output which is inverted by the inverter 60 to provide the previously mentioned logic 0 signal applied to the NOR gate 55 from the inverter 60. Similarly, the rewind input signal is also logic 0 that the NOR gate 56 is enabled and therefore issues a logic 1 output signal which is inverted by the inverter 61 to provide another logic 0 input to the NOR gate 64. The NOR gate 65 is also enabled under these conditions and therefore will have transmitted a positive pulse across coupling capacitor 66 to the reset input of flip flop 69. The flip flop 69 however, is locked into the set state by the logic 1 signal applied to the NOR gate 68 from the inverter 59. Thus, the output from the NOR gate 68 is 0 such that the NOR gate 73 is fully enabled and issues a logic 1 which renders the driver transistor 74 in the conduction state to hold the brake solenoid coil 30 in the energized position and the solenoid 22 actuated (see FIG. 2).

The logic 1 output signal from the inverter 59 also forward biases the driver transistor 70 for the motion enable relay 34 such that the contact sets 34a and 34i b assume their alternate positions. As a result, 90 volts a-c is applied through the contact set 36c, the contact set 35b, the contact set 36d, and the contact set 34a to the supply reel motor 1. Similarly, 90 volts a-c passes through the contact set 36c, and the contact set 34b and is applied to the take-up reel motor 2. Thus, during a normal play mode of operation, both the supply reel motor 1 and the take-up reel motor 2 receive energization which is, as previously noted, in opposite directions such that the take-up reel tends to take up the tape being handled and the rewind reel tends to apply back tension, the tape motion being controlled in the conventional manner by the driven capstan and the pinch roller (not shown).

STOP FROM PLAY MODE

When a stop operation is commenced, the play, fast forward and rewind signals are all forced to the "off" state which is logic 1 for the play signal and logic 0 for the fast forward and rewind signals. Thus, the logic 1 placed on the fourth input to the NOR gate 64 disables that gate which responds by issuing a logic 0 output whereby both the NOR gates 50 and 54 become fully enabled with logic 0 appearing at all their respective inputs. NOR gate 49 remains disabled by virtue of the logic 1 received from the inverter 52. The logic 1 output from the NOR gate 54 is inverted through the inverter 59, and the resultant voltage applied to the base electrode of the driver transistor 70 for the motion enable relay 34 cuts the driver transistor off to permit the motion enable relay to drop out. A logic 0 is now applied to the set input to the flip flop 69.

The logic 1 output signal from the NOR gate 50 disables the NOR gate 58 which therefore issues a logic 0 which is inverted through the inverter 60 to a logic 1. This signal is applied to the base electrode of the driver transistor 71 for the fast forward relay 35 causing the fast forward relay to pull in and its contact sets to assume their alternate positions. The logic 1 from inverter 60 also serves to disable the NOR gate 65 which therefore issues a logic 0. As long as motion continues, NOR gate 73 remains fully enabled to place a forward biasing signal on the gate electrode to driver transistor 74 for the brake solenoid coil 30, thereby holding the mechanical braking system in the position shown in FIG. 2.

As previously mentioned, in order to avoid spillage, differential dynamic braking must be applied in accordance with the tape direction. Thus, 65 volts d-c passes through the contact set 36a, contact set 35a, diode 77, contact set 36b, and contact set 34a to the supply reel motor 1. Additionally, the 65 volts d-c is dropped to a lower value through the braking differential resistor 78 and is applied through contact set 34b to take-up reel motor 2. It will therefore be seen that a higher value of braking torque is applied to the supply reel motor 1 than is applied to the take-up reel motor 2 during deceleration.

When the motion sense amplifier 41 senses that the scanning wheel 40 has stopped, the output from the motion sense amplifier 41 switches to a logic 1 which disables the NOR gate 50. The output signal from the NOR gate 50 therefore switches to a logic 0 which enables the NOR gate 58, and the resultant logic 1 signal from the NOR gate 58 is inverted through the inverter 60 to a logic 0 which cuts off the driver transistor 71 of the fast forward relay 35. NOR gate 65 is fully enabled, and its output switches to a logic 1 which couples a positive going pulse to the reset input to flip flop 69 which therefore resets.

STOPPED MODE

Both the logic 1 output from the motion sense amplifier 41 and the logic 1 output from the Q output of the flip flop 69 serve to disable the NOR gate 73, and the resultant logic 0 output applied to the base electrode of the driver transistor 74 for the brake solenoid coil 30 causes the brake solenoid to drop out. When this takes place, the mechanical braking system assumes the position shown in FIG. 1 to obtain mechanical holding operation.

The function of the flip flop 69 is essentially to obtain safety action whereby rotating the supply reel motor 1 manually, as when tape is being threaded onto the transport will not cause "chattering" of the fast forward 35 and rewind 36 relays. By way of example, when the apparatus enters the "stopped" mode from "stop from play" mode, the positive going pulse from the NOR gate 65 is coupled to the second input to NOR gate 73 through diode 94 to disable NOR gate 73 and also cause the flip flop 69 to assume the reset state which then holds the logic 1 signal, through isolation resistor 95, on the second input to the NOR gate 73. Thus, the NOR gate 73, in the stop mode, is held disabled even should the supply reel motor 1 be manually turned to tend to generate transient logic 0 pulses from the motion sense amplifier 41. Consequently, the driver transistor 74 remains off and the brake solenoid coil 30 remains deenergized. Nevertheless, it is necessary to insure that no false logic 0 states at all be observed at the output of motion sense amplifier 41 in the stopped mode because of their potential effect on the NOR gate 49 and 50 and hence the relays 35 and 36. The supply voltage for the mechanical brake solenoid coil 30 is therefore reflected to the base electrode of the motion sense inhibit transistor 75 to effectively remove power from the motion sense amplifier 41 by placing the circuit side of the resistor 76 near ground potential (FIG. 5). Thus, the output of the motion sense amplifier 41 observed by the NOR gates 49 and 50 is a logic 1 impressed through resistor 79 from the 12 volt d-c power source. Until a subsequent play, fast forward or rewind mode of operation is instituted, the brake solenoid coil 30, the motion enable relay 34, fast forward relay 35 and rewind relay 36 remain deenergized, regardless of how the transport is handled manually.

As previously noted, institution of any one of the play, fast forward, or rewind modes results in a logic 1 output from the inverter 59 which sets the flip flop 69 to place a logic 0 onto the second input to the NOR gate 73. The first input to the NOR gate 73 will also be at logic 0 coupled through the diode 63 from the output of the NOR gate 54, isolation being provided from the output of the motion sense amplifier by the resistor 62. Thus, the NOR gate 73 is enabled to issue a logic 1 output causing the driver transistor 74 to become conductive. This removes the bias from the motion sense inhibit transistor 75 and restores power to the motion sense amplifier 41. The next "lack of motion" state sensed by the motion sense amplifier 41 will start the safety sequence in operation once again.

FAST FORWARD MODE

In the fast forward mode of operation, the play signal input is "off" (logic 1) the fast forward signal input is "on" (logic 1), and the rewind signal is "off" (logic 0). As a result, NOR gates 49, 50, and 54 are all disabled and issue logic 0 signals. Since the fast forward input signal is a logic 1, the NOR gate 58 is also disabled to issue a logic 0. However, both inputs to the NOR gate 56 are logic 0, and it consequently issues a logic 1 which is inverted through the inverter 61 to a logic 0. The logic 0 signals appearing at the inputs to each of the inverters 59 and 60 are inverted to provide logic 1 signals to the base electrodes of respective driver transistors 70 and 71 for the motion enable relay 34 and fast forward relay 35 to pull these relays in. The motion sense amplifier 41 output will be logic 0 indicating motion of the supply reel motor 1. The logic 1 appearing at the output of inverter 60 serves to disable the NOR gate 65 which therefore issues a logic 0 output. The logic 1 impressed by the output from inverter 59 onto one input to the NOR gate 68 holds the flip flop 69 in the set state. Thus, NOR gate 73 is fully enabled to place a positive voltage on the base electrode of the driver transistor 74 for the brake solenoid coil 30 such that the mechanical braking system assumes the position depicted in FIG. 2.

As a result of the energization of the motion enable relay 34 and the fast forward relay 35 and the deenergized state of the rewind relay 36, 40 volt a-c passes through the contact set 36c, contact set 35b, contact set 36d, and contact set 34a to the supply reel motor 1. 117 volt a-c is applied through contact set 35c and contact set 34b to take-up reel motor 2. Thus, the forward torque applied by the take-up reel motor 2 exceeds that of the back tension torque applied by the supply reel motor 1, and fast forward movement of the tape being handled is obtained.

STOP FROM FAST FORWARD MODE

When a stop mode is entered from the fast forward mode, the fast forward signal switches from "on" to "off"; i.e., from logic 1 to logic 0. As a result, both the NOR gates 50 and 54 become fully enabled to issue a logic 1 output. Thus, the NOR gate 58 remains disabled even though, as previously noted, the fast forward signal has switched to a logic 0. Therefore, the input signal to inverter 59 switches to logic 1 while the input signal to the inverter 60 remains logic 0. The inverter output signals from the inverters 59 and 60, applied respectively to the base electrodes of driver transistor 70 and 71, permit the motion enable relay 34 to drop out while the fast forward relay 35 remains energized. 65 volt d-c passes through the contact set 36a, contact set 35a, diode 77, contact set 36b, and contact set 34a to the supply reel motor 1. Additionally, the 65 volt d-c is dropped across braking differential resistor 78 and passes through contact set 34b to be applied to take-up reel motor 2. Thus, as in the stop from play mode, deceleration takes place with differential braking, a higher braking torque being applied to the supply reel motor 1 then to the take-up reel motor 2 in order to avoid tape spillage.

When the supply reel motor 1 comes to a complete stop, the output from the motion sense amplifier 41 switches from a logic 0 to a logic 1 to disable NOR gate 50 which therefore issues a logic 0 to enable the NOR gate 58. The logic output from the NOR gate 58 is inverted through the inverter 60 to issue a logic 0 output to shut off the driver transistor 71 for the fast forward relay 35 which therefore drops out. Additionally, as previously described, the logic 1 from the motion sense amplifier 41 serves to reset the flip flop 69 to disable the NOR gate 73 which places a logic 0 signal level on the base electrode of the driver transistor 74 for the brake solenoid coil 30. Consequently, the brake solenoid drops out, the mechanical braking system takes over by assuming the position depicted in FIG. 1, and the motion sense inhibit transistor 75 temporarily removes power from the motor sense amplifier 41.

REWIND MODE

In the rewind mode, the play input signal is "off" (logic 1) the fast forward input signal is "off" (logic 0) and the rewind input signals is "on" (logic 1). The motion sense amplifier 41 issues a logic 0 indicating motion of the supply reel motor 1. The NOR gates 49, 50, 54, and 64 are all disabled and issued logic 0 signals. The NOR gate 56 is also disabled by the logic 1 rewind input signal. However, the NOR gate 58 is enabled and issues a logic 1. Thus, the input signals to the inverters 59, 60, and 61, are respectively, logic 0, logic 1, and logic 0, and the NOR gate 65 is disabled. Therefore, the motion enable relay 34 and rewind relay 36 are energized and the fast forward relay 35 is deenergized. The NOR gate 73 is enabled such that the brake solenoid coil 30 is energized and the motion sense inhibit transistor 75 is cut off.

40 volts a-c passes through contact set 36c, contact set 35c, and contact set 34b to the take-up reel motor 2. 117 volts a-c passes through the contact set 36d and contact set 34a to the supply reel take-up motor 1. Consequently, the torque exerted by the supply reel motor 1 exceeds that exerted in the opposite direction by the take-up reel motor 2, and the rewind operation is obtained.

STOP FROM REWIND

When the stop from rewind mode is entered, the rewind signal switches from logic 1 to logic 0 which enables NOR gate 54. The resultant logic 1 output from NOR gate 54 is inverted through inverter 59 to a logic 0 which cuts off the driver transistor 70 of the motion enable relay 34. Thus, only the rewind relay 36 remains energized. 65 volts d-c passes through the contact set 36a, the diode 77, the contact set 35b and the contact set 34b to the take-up reel motor 2. Additionally, the 65 volt d-c is dropped across the braking differential resistor 78 and passes through the contact set 34 to the supply reel motor 1. Thus, differential braking is obtained with the greater braking torque being provided by the take-up reel motor 2 to prevent spillage of the tape.

When the motion sense amplifier 41 senses that the supply reel motor 31 has ceased to turn, its output switches from logic 0 to logic 1 to reset the flip flop 69 and disable the NOR gate 73, causing the brake solenoid 22 to drop out whereby the mechanical braking system comes into action as depicted in FIG. 1, and the motion sense inhibit transistor 75 removes power from the motion sense amplifier 41. Simultaneously, the NOR gate 49 is disabled and therefore issues a 0 output which enables the NOR gate 56. The logic 1 input to the inverter 61 is inverted to apply a disabling signal to the gate electrode of the drive transistor 72 for the rewind relay 36 which therefore drops out.

EMERGENCY STOP

Consider now the operation obtained upon unexpected loss of power when the tape transport is functioning in motion in any of the above described modes. Manifestly, loss of power will cause the brake solenoid coil 30 to become deenergized such that solenoid 22 drops out and the mechanical braking system falls into the position shown in FIG. 1 even though the reel motors are in motion. Consequently, the brake pads 9 and 16 engage the drums 4 and 5, respectively, to apply braking forces to the reel motors 1 and 2 for controllably bringing the system to a halt. It is particularly significant to note that the mechanical braking system of FIG. 1 applies the requisite differential braking forces regardless of the direction in which the tape is traveling. If the tape is moving from a reel driven by the supply reel motor 1 to a reel driven by the take-up reel motor 2, the drums 4 and 5 will be rotating in a counterclockwise direction. Consequently, the drum 4 will tend to pull the brake pad 9 into more complete engagement to obtain increased braking torque. The amount of additional engagement is limited by the abutment of the straight end of the pivot arm 6 against the banking pin 13. Simultaneously, the counterclockwise rotation of the drum 5 will urge the brake pad 16 into a position of somewhat decreased engagement with the drum 5, thereby setting up a condition of less, but still substantial braking torque to the take-up reel motor 2. By virtue of this automatic differential braking action, smooth braking to a halt without tape spillage is obtained.

It will readily be seen that correct differential braking is also obtained if the tape transport is operating in the rewind mode when power failure occurs. Thus, the tape would be passing from a take-up reel driven by the take-up reel motor 2 to a supply reel driven by the supply reel motor 1, and the drums 4 and 5 would be turning clockwise. The brake pad 16 is therefore pulled into further engagement with the drum 5 to obtain increased braking torque, the limit of engagement being governed by the abutment of the straight end of the pivot arm 14 against the banking pin 19. The brake pad 10, in the meantime, is urged into a position of decreased engagement with the drum 4 to obtain decreased braking torque to the supply reel motor 1.

Figure 6:
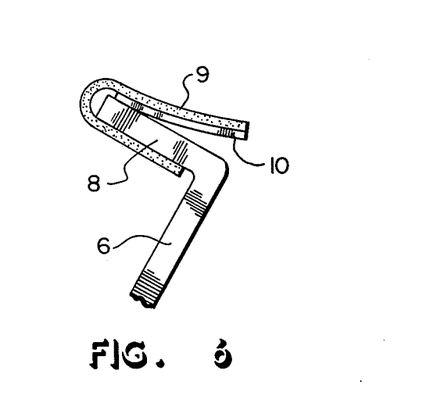
FIG. 6 is a partial detailed view of a brake pivot arm illustrating a preferred configuration for the brake pad and supporting structure for the pad.

The presently preferred configuration for the pad end of the pivot arms is shown enlarged in FIG. 6. It has been found advantageous to bond the brake pad 6 to the outboard surface of the leaf spring 10, around the tip of and to the inner surface of the right angle portion 8 of the pivot arm 6. This particular configuration has been found to give complete reliability in operation and facilitates the differential braking action required when the mechanical braking system is called upon to bring the transport to a halt upon power failure.

Figure 8:
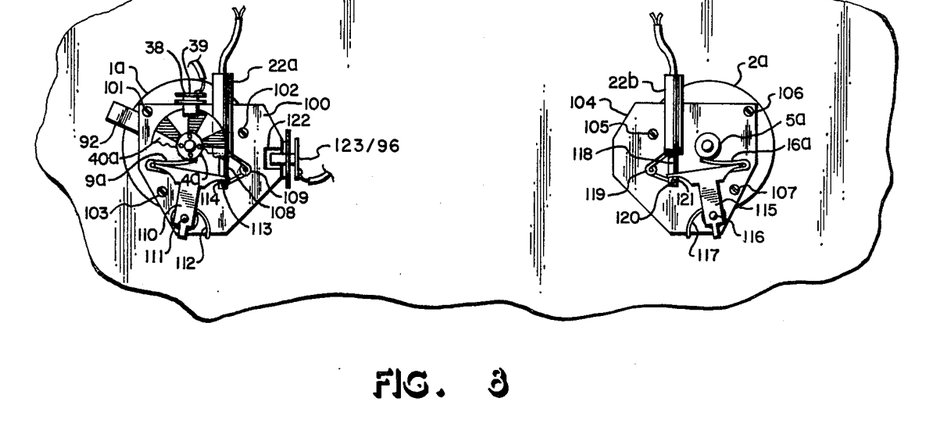
FIG. 8 is a partial underside view of a tape transport illustrating a variant embodiment of the invention with the principal elements of the mechanical brake assembly in the holding position.
Figure 9:
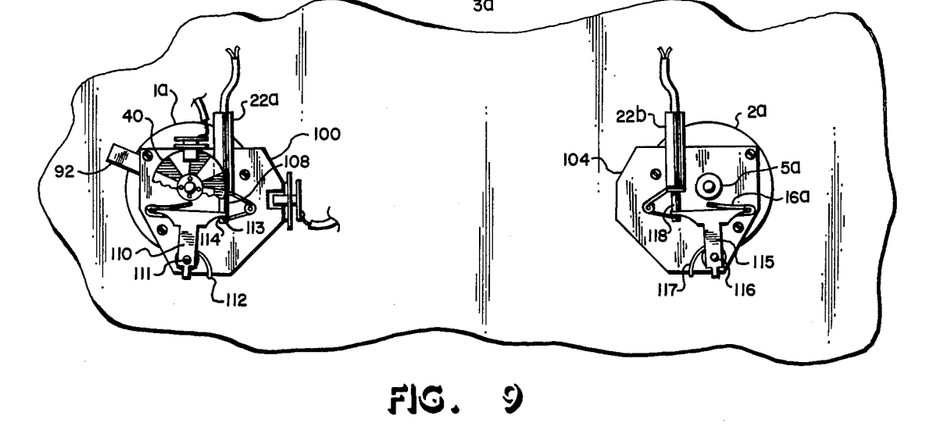
FIG. 9 is a view similar to FIG. 8, but showing the mechanical brake assembly in a run position.

Attention is now directed to FIGS. 8 and 9 which illustrate a variant configuration of the invention in which the electro-mechanical braking means is situated on the lower ends of the reel motors whereby improved accessibility for adjustment and service is obtained. Thus, it will be understood that the supply reel motor 1a and the take-up reel motor 2b extend upwardly from the underside of the support plate 3a, i.e., FIGS. 8 and 9 are views in which the tape transport has been inverted for accessibility to the mechanical braking subsystem.

As shown in both FIGS. 8 and 9, a frame member 100 for carrying the mechanical brake sub-system associated with the supply reel motor 1a is supported from the bottom thereof by bolts 101, 102, and 103. Spacers through which the bolts 101, 102, and 103 pass (and not shown in FIGS. 8 and 9) serve to appropriately space the frame 100 from the housing of the supply reel motor 1a. Similarly, frame 104 supports the mechanical braking sub-system associated with the take-up reel motor 2a and is positioned by bolts 105, 106, and 107 and spacers (not shown in FIGS. 8 and 9).

In addition to the mechanical braking subsystem associated with the supply reel motor 1a, the frame 100 also carries motion sensing disc 40a and light emitting diode/light sensitive transistor combination 38/39 which has been previously described in conjunction with FIG. 4. Also, the direction sensing pick-up means including a movable tab 92 and light emitting diode/light sensitive transistor combination 123/96 serves to provide direction sensing information in a manner closely similar to that already discussed in conjunction with FIGS. 7A and 7B and to be discussed in further detail below in conjunction with FIGS. 10A and 10B.

T-shaped pivot arm 110 carries brake pad 9a across its cross-portion and is pivotally fixed to the frame 100 for rotation about pivot means 111 disposed proximate the lower end of the pivot arm 110. A coil spring 112 disposed about the pivot means 111 and between the frame 100 and the inner surface of the pivot arm 110 serves to urge the pivot arm 110 in the clockwise direction about the pivot point 111 in the view of FIGS. 8 and 9. A pull solenoid 22a is provided with a plunger 108 which, in the deenergized position depicted in FIG. 8, is urged to its fully extended position by means of a spring 109. It may be noted that the function of spring 109 may also readily be carried out by employing a compression spring situated within the housing of solenoid 22a. A pin 113 is carried near the outboard end of the plunger 108 and is positioned to engage the cross portion of the pivot arm 110 in the region 114 when the solenoid 22a is energized. It will be seen in FIG. 8, that, with the solenoid 22 deenergized, the spring 112 urges the pivot arm 110 in a clockwise direction to bring the brake pad 9a into the holding position which directly corresponds to the position observed in FIG. 1.

The electro-mechanical braking sub-system carried by the frame 104 is substantially a mirror image of that carried by the frame 100. Thus, pivot arm 115 is urged for rotation in a counter-clockwise direction about pivot means 116 by coil spring 117. The pivot arm 115 carries brake pad 16a for selective engagement with drum 5a. Solenoid 22b includes a plunger 118 carrying, proximate its outboard end, a pin 120 adapted to engage, at the region 121, the pivot arm 115 when the solenoid is energized.

From the foregoing, it will be understood that the tape transport state illustrated in FIG. 8 directly corresponds to that illustrated in FIG. 1. That is, FIG. 8 illustrates the mechanism in a holding position with the solenoids 22a and 22b (which are selectively driven in parallel under precisely the same logical conditions previously discussed in conjunction with the selective energization of solenoid 22 of FIGS. 1 and 2) being deenergized.

Consider now the condition illustrated in FIG. 9, which corresponds directly to that illustrated by the alternate mechanism as shown in FIG. 2, and in which the solenoids 22a and 22b are now energized under the same logic and control conditions previously discussed in conjunction with the solenoid 22 (and its coil 30). Thus, energization of the solenoids 22a and 22b causes retraction of their respective plungers 108 and 109 and the abutment of pins 113 and 120 against the contact points 114 and 121. Consequently, the pivot arm 110 has been rotated in the counterclockwise direction against the bias of the spring 112 to remove contact between the brake pad 9a and the drum 4b. Similarly, the pivot arm 115 has been rotated in a clockwise position against, the bias of the spring 117, sufficiently to remove contact between the brake pad 16a and the drum 5a. It will therefore be understood that the condition illustrated in FIG. 9 corresponds directly to that illustrated in FIG. 2; i.e., the mechanical braking system has been rendered inoperative by the energization of the solenoids 22a and 22b under one of the same several conditions previously discussed which will bring about the energization of the solenoid 22 in the alternate configuration illustrated in FIGS. 1 and 2.

Figure 10A:
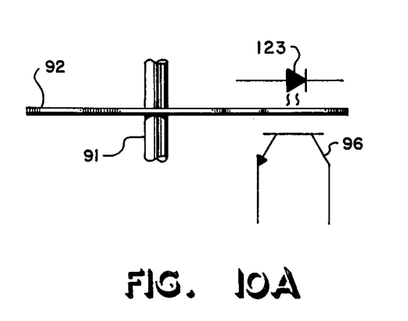
FIGS. 10A and 10B, taken together, illustrate, in additional detail, the direction sensor block of the diagram of FIG. 4 as employed in the invention embodiment illustrated in FIGS. 8 and 9.
Figure 10B:
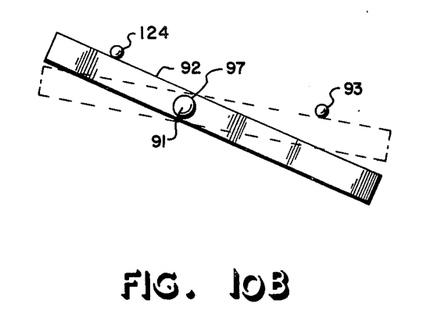

FIGS. 10A and 10B correspond very closely to FIGS. 7A and 7B. An elongated tab 92 is provided with an aperture 97 intermediate along its length and a little offset from the center thereof. The shaft 91 of the supply reel motor 1a extends, with slight clearance, through the aperture 97. A light emitting diode 123 and a light sensitive transistor 96 are disposed on opposite sides of the tab 92 and in alignment with one another. The tab is free to move about the shaft a few degrees limited by banking pins 93 and 124 which may constitute the previously mentioned spacers through which bolts 101 and 102 (FIGS. 8 and 9) pass. When the tab 92 is banked against pin 93, the light beam between light emitting diode 123 and light sensitive transistor 96 is interrupted thereby providing a first direction indication. In this position, the tab 92 would be visible in the slot 122 of the frame 100. When the tab 92 is banked against the pin 124, the light emitting diode 123 and the light sensitive transistor 96 are in light communication thereby providing a second direction indication. In operation, sufficient friction exists between the shaft 91 and the aperture 97 to throw the tab 92 against one or the other of the banking pins 93 and 124 with the shaft thereafter simply turning freely in the aperture.

It will be observed that the scanning wheel 40a comprises alternate sectors of opaque and translucent materials and thus corresponds directly to the configuration illustrated in FIG. 4 in which the light emitting diode 38 and the light sensitive transistor 39 lie on opposite sides of the wheel 40. Thus, this arrangement is preferred for the embodiment of the invention illustrated in FIGS. 8 and 9 as opposed to the previously discussed variant configuration preferably employed in the embodiment of the invention illustrated in FIGS. 1 and 2 and in which the scanning wheel 40 comprises alternate sectors of reflective and non-reflective material with the light emitting diode 38 and the light sensitive transistor 39 being disposed on the same side of the scanning wheel.

Upon loss of power during any mode of operation in which the tape transport is in motion, emergency stop will be obtained with differential braking during the stopping process by the apparatus depicted in FIGS. 8 and 9 in the same manner as previously described for the apparatus depicted in FIGS. 1 and 2.

While the principles of the invention have now been made clear in an illustrative embodiment, there will be immediately obvious to those skilled in the art many modifications of structure, arrangements, proportions, the elements, materials and components, used in the practice of the invention which are particularly adapted for specific environments and operating requirements without departing from those principles.

What is claimed is:

1. A compound electro-mechanical braking and holding system for a magnetic tape transport which includes conventional A.C. supply and take-up reel motors, said braking system comprising:
   (A) motion sensing means for differentiating between motion and lack of motion of said transport;
   (B) dynamic braking means for applying braking currents to both of said motors only when both a stop mode of operation has been instituted and motion of said tape transport is sensed;
   (C) mechanical braking means for holding each of said reel motors whenever both a stop mode of operation has been instituted and motion of said tape transport is not sensed; and
   (D) control means responsive to the institution of a stop mode of operation and to said motion sensing means for activating said dynamic braking means when both a stop mode of operation has been instituted and when motion of said tape transport is sensed and for subsequently deactivating said dynamic braking means and activating said mechanical braking means when motion of said tape transport is not sensed.

2. The braking and holding system of claim 1 in which said mechanical braking means includes first and second brake pads and spring means adapted to bias said first and second brake pads toward respective braking engagement with said supply and take-up reel motors, said mechanical braking means further including solenoid means being electrically connected to said control means, said solenoid means being mechanically coupled to said first and second brake pads such that said first and second brake pads are disengaged, against the bias supplied by said spring means, from said supply and take-up reel motors when said solenoid means is energized, said electrical connection from said control means to said solenoid means de-energizing said solenoid means when lack of motion of said tape transport is sensed.

3. The braking and holding system of claim 1 wherein said control means includes logic circuitry electrically connected to said motion sensing means and to said dynamic braking means for applying said braking currents and for deactivating said dynamic braking means.

4. The braking and holding system of claim 3 wherein said control means includes solenoid means electrically connected to said logic circuitry and mechanically coupled to said mechanical braking means such that said mechanical braking is deactivated to be disengaged from said reel motors when said solenoid means is energized, said logic circuitry energizing said solenoid means when motion of said tape transport is sensed, said logic circuitry deenergizing said solenoid means when lack of motion of said tape transport is sensed.

5. A braking and holding system for a magnetic tape transport which includes supply and take-up reel motors, said braking system comprising:
   (A) a dynamic braking system including:
      (i) motion sensing means for differentiating between motion and lack of motion of one of said reel motors;
      (ii) direction sensing means for sensing the direction of rotation of one of said reel motors;
      (iii) logic means responsive to:
         (a) the institution of a stop mode of operation;
         (b) sensed motion of said one of said reel motors to which said motion sensing means is sensitive; and
         (c) sensed direction of rotation of said one of said reel motors to which said direction sensing means is sensitive
      for applying differential d-c braking currents to said reel motors, a greater d-c braking current being applied to said supply reel motor when said stop mode is instituted from an operation mode in which said one of said reel motors to which said direction sensing means is sensitive to is rotating in a first direction, and a greater d-c braking current being applied to said take-up reel motor when said stop mode is instituted from an operation mode in which said one of said reel motors to which said direction sensing means is sensitive is rotating in a second direction;
   (B) a mechanical braking system including:
      (i) first and second brake drums carried, respectively, by said supply and take-up reel motors;
      (ii) first and second pivot arms, each of said pivot arms comprising:
         (a) an elongated major length portion;
         (b) a right angle portion at one end of and merging at a junction with said major length portion;
         (c) a leaf spring fixed only at the outer end of an outboard side of said right angle portion, a free end of said leaf spring extending back along said right angle portion and terminating proximate said junction;
         (d) a brake pad overlaying said leaf spring, said leaf spring being configured such that its free end spring-biases said brake pad generally forwardly from said outboard side of said right angle portion;
         (e) pivot support means intermediate the length of said major length portion; and
         (f) spring bias means for applying torque about said pivot support means, which torque urges said pivot arm to pivot in a direction which brings said brake pad into braking engagement with one of said drums;
      (iii) a solenoid;
      (iv) linkage means linking said solenoid to said first and second pivot arms, said linkage means comprising:
         (a) a pivot member disposed intermediate said first and second pivot arms, said pivot member having first and second ends and being adapted for rotation about a pivot intermediate its length;
         (b) a first link extending from said first end of said pivot member to a second end of said first pivot arm;

(c) a second link extending from said second end of said pivot member to a second end of said second pivot arm; and (d) means coupling said solenoid to said pivot member such that energization of said solenoid effects pivotal movement of said pivot member in a direction which pulls said second ends of said first and second pivot arms toward one another; and (C) control means responsive to sensed motion of said tape transport for energizing said solenoid; said control means being further responsive to sensed lack of motion of said tape transport for deenergizing said solenoid.

6. The braking and holding system of claim 5 in which said first and second pivot arms are mutually oriented with their respective right angle portions directed away from one another whereby deenergization of said solenoid and consequent actuation of said mechanical braking system while said reel motors are in motion obtains differential mechanical braking by virtue of one of said brake pads being pulled into increased engagement by the rotation of its respective brake drum and the other of said brake pads being pushed into decreased engagement by the rotation of its respective brake drum.

7. The braking and holding system of claim 6 in which the angle of rotation of each of said pivot arms in the drum-engaging direction is limited by a banking pin against which said pivot arm abuts.

8. A braking and holding system for a magnetic tape transport which includes supply and take up reel motors, said braking system comprising:

(A) a dynamic braking system including:
(i) motion sensing means for differentiating between motion and lack of motion of one of said reel motors;
(ii) direction sensing means for sensing the direction of rotation of one of said reel motors;
(iii) logic means responsive to:
(a) the institution of a stop mode of operation;
(b) sensed motion of said one of said reel motors to which said motion sensing means is sensitive; and
(c) sensed direction of rotation of said one of said reel motors to which said direction sensing means is sensitive
for applying differential d-c braking currents to said reel motors, a greater d-c braking current being applied to said supply reel motor when said stop mode is instituted from an operation mode in which said one of said reel motors to which said direction sensing means is sensitive to is rotating in a first direction, and a greater d-c braking current being applied to said take-up reel motor when said stop mode is instituted from an operation mode in which said one of said reel motors to which said direction sensing means is sensitive is rotating in a second direction;

(B) a mechanical braking system including:
(i) first and second brake drums carried, respectively, by said supply and take-up reel motors;
(ii) first and second frame members juxtaposed, respectively, with said supply and take-up reel motors;
(iii) first and second pivot arms, supported, respectively, on said first and second frame members, each of said first and second pivot arms comprising:
(a) an elongated major length portion;
(b) a right angle portion joining said major length portion at one end thereof;
(c) a leaf spring fixed at the outer end of an outboard side of said right angle portion, a free end of said leaf spring extending back along said right angle portion and terminating proximate the region at which said major length portion and said right angle portion join;
(d) a brake pad overlaying said leaf spring, said leaf spring being configured such that its free end spring-biases said brake pad generally forwardly from said outboard side of said right angle portion;
(e) pivot support means proximate the opposite end of said major length portion from the end which joins with said right angle portion; and
(f) spring bias means for applying torque about said pivot support means, which torque urges said pivot arm to pivot in a direction which brings said brake pad into braking engagement with one of said drums;
(iii) first and second solenoids supported, respectively, on said first and second frame members, each of said solenoids including a plunger;
(iv) means coupling said plunger of each of said solenoids to one of said pivot arms such that energization of said solenoid throws said pivot arm to a position in which said brake pad carried thereby is disengaged from said brake drum; and (C) control means responsive to sensed motion of said tape transport for energizing both of said solenoids; said control means being further responsive to sensed lack of motion of said tape transport for deenergizing both of said solenoids.

9. The braking and holding system of claim 8 in which said motion sensing means includes a first light source and a first light sensitive element supported on one of said frame members and which further includes a disc carried by the shaft of the reel motor with which said one of said frame members is juxtaposed, said disc being configured to alternately interrupt and permit light communication between said first light source and said first light sensitive element.

10. The braking and holding system of claim 8 or claim 9 in which said direction sensing means includes a second light source and a second light sensitive element supported on one of said frame members and which further includes a tab with an aperture intermediate along its length through which loosely fits the shaft of the reel motor with which said one of said frame member is juxtaposed, said tab being restrained to rotate through a limited arc by banking means which serve to stop said tab at a limit in each direction of rotation, said tab being dimensioned and disposed to interrupt light communication between said second light source and said second light sensitive element when banked at one limit and to permit light communication between said second light source and said second light sensitive element when banked at its alternate limit.

11. The braking and holding system of claim 8 in which said first and second pivot arms are mutually oriented with their respective brake pad free ends directed toward one another whereby deenergization of said solenoids and consequent actuation of said mechanical braking system while said reel motors are in motion obtains differential mechanical braking by virtue of one of said brake pads being pulled into increased engagement by the rotation of its respective brake drum and the other of said brake pads being pushed into decreased engagement by the rotation of its respective brake drum.

12. A braking and holding system for a magnetic tape transport which includes supply and take-up motors which carry, respectively, first and second brake drums, said braking system comprising:

(A) motion sensing means for differentiating between motion and lack of motion of said transport;

(B) dynamic braking means responsive to the institution of a stop mode of operation and to sensed motion of said transport for applying braking currents to both said motors;

(C) mechanical braking means for each of said reel motors, said mechanical braking means including first and second brake pads juxtaposed respectively to said first and second brake drums and first and second pivot arms on which said first and second brake pads are mounted, respectively, on first ends of said first and second pivot arms, said first ends of said pivot arms comprising pad-carrying arm portions disposed at right angles with respect to major length portions of said pivot arms, said pad-carrying arm portions each supporting a leaf spring overlayed with one of said brake pads, each of said pivot arms being pivotally mounted whereby rotation of said pivot arm in first and second direction brings its respective brake pad into corresponding braking engagement and disengagement positions with one of said brake drums, each of said leaf springs being configured and oriented to urge one end of said one of said brake pads generally outwardly from said pivot arm toward the one of said brake drums it selectively engages such that engagement between said brake pad and said brake drum causes said leaf spring to deflect and obtains frictional braking governed by the pressure exerted on said brake pad by said leaf spring, said mechanical means further including spring means adapted to bias said pivot arm toward respective braking engagement of said first and second brake pads with said first and second brake drums; and (D) control means responsive to sensed motion of said tape transport for decoupling said mechanical braking means from said reel motors, said mechanical braking means further including solenoid means responsive to said control means, said solenoid means being coupled to said first and second pivot arms such that said first and second brake pads are disengaged, against the bias supplied by said spring means, from said first and second brake drums when said solenoid means is energized and said first and second brake pads engage respectively said first and second brake drums under the bias of said spring means when said solenoid means is de-energized.

13. The braking and holding system of claim 12 in which said leaf spring is fixed to said pad-carrying arm portion only proximate the outer end thereof, a free portion of said leaf spring extending from its fixed portion along said pad-carrying arm portion and terminating proximate a bend defining a junction between said pad-carrying arm portion and said major length portion.

* * * * *

UNITED STATES PATENT AND TRADEMARK OFFICE
CERTIFICATE OF CORRECTION

PATENT NO. : 4,223,855
DATED : September 23, 1980
INVENTOR(S) : Juozas Briedis and Ronald B. Richter It is certified that error appears in the above-identified patent and that said Letters Patent are hereby corrected as shown below:

Column 4, line 62 to Column 5, line 3 delete the entire Paragraph.
Column 5, line 51 "since" should read --sense--.
Column 7, line 68 "55" should read --64--.
Column 8, line 1 after "logic 0" insert --such--; line 12 "conduction" should read --conducting--; line 17 "34i b" should read --34b--; line 22 after "36c" insert --the contact set 35c--; line 60 "to" should read --of--.
Column 11, line 66 "31" should read --1--.
Column 13, line 3 "2b" should read --2a--; line 49 "22" should read --22a--.
Column 14, line 11 "109" should read --118--; line 17 "4b" should read --4a--.

Signed and Sealed this

Thirteenth Day of July 1982

[SEAL]

Attest:

Attesting Officer

GERALD J. MOSSINGHOFF

Commissioner of Patents and Trademarks